United States Patent
Oroskar et al.

(10) Patent No.: US 8,526,906 B1
(45) Date of Patent: Sep. 3, 2013

(54) ACTIVE SET MANAGEMENT BASED ON MOBILE STATION BATTERY POWER

(75) Inventors: Siddharth S. Oroskar, Overland Park, KS (US); Srikanth Pulugurta, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 549 days.

(21) Appl. No.: 12/794,518

(22) Filed: Jun. 4, 2010

(51) Int. Cl.
*H04B 1/16* (2006.01)
*H04B 1/38* (2006.01)

(52) U.S. Cl.
USPC ............... 455/343.1; 455/574; 455/343.5; 455/67.11

(58) Field of Classification Search
USPC ............. 455/572, 573, 574, 127.1, 127.5, 455/343.1, 343.2, 343.5, 550.1, 67.11
See application file for complete search history.

(56) References Cited

U.S. PATENT DOCUMENTS

| | | | |
|---|---|---|---|
| 5,577,022 A | 11/1996 | Padovani et al. | |
| 5,999,522 A | 12/1999 | Rohani | |
| 6,058,136 A | 5/2000 | Ganesh et al. | |
| 6,160,999 A | 12/2000 | Chheda et al. | |
| 6,222,347 B1 * | 4/2001 | Gong | 320/137 |
| 6,317,453 B1 | 11/2001 | Chang | |
| 6,922,561 B2 | 7/2005 | Chen et al. | |
| 6,960,939 B2 | 11/2005 | Ngo | |
| 7,050,804 B1 | 5/2006 | Wurtenberger et al. | |
| 7,076,265 B2 | 7/2006 | Tayloe et al. | |
| 7,302,265 B1 | 11/2007 | Chalishazar et al. | |
| 7,529,546 B1 | 5/2009 | Sigg | |
| 2002/0049058 A1 | 4/2002 | Tee | |
| 2002/0119787 A1 | 8/2002 | Hunzinger | |
| 2002/0142772 A1 | 10/2002 | Hunzinger | |
| 2003/0186707 A1 | 10/2003 | Pihl et al. | |
| 2003/0195017 A1 | 10/2003 | Chen et al. | |
| 2005/0020203 A1 | 1/2005 | Losh et al. | |
| 2006/0135173 A1 | 6/2006 | Vannithamby | |
| 2006/0159051 A1 | 7/2006 | English | |
| 2006/0227744 A1 | 10/2006 | Metke et al. | |
| 2007/0091836 A1 * | 4/2007 | Oprescu-Surcobe et al. | 370/318 |
| 2008/0076432 A1 | 3/2008 | Senarath et al. | |

OTHER PUBLICATIONS

Unpublished U.S. Appl. No. 12/725,294, filed Mar. 16, 2010 entitled "Uniform Reverse-Link Power Control for an Active Set of a Mobile Station".

(Continued)

Primary Examiner — John J Lee

(57) ABSTRACT

Exemplary methods and systems are disclosed herein to adjust active-set parameters based on the remaining battery life of a mobile station, generally in order to conserve battery power when the battery is low. An exemplary method involves: (a) a mobile station determining a battery-power level of the mobile station; (b) the mobile station using the determined battery-power level as a basis for setting at least one active-set parameter affecting the number of active sectors in an active set of the mobile station; and (c) the mobile station maintaining the active set according to the at least one active-set parameter. In an exemplary embodiment, the mobile station may set a maximum number of active sectors that the mobile station can include in the active set and/or parameters affecting whether a sector is included in the active set.

30 Claims, 8 Drawing Sheets

(56) References Cited

OTHER PUBLICATIONS

Unpublished U.S. Appl. No. 12/605,457, filed Oct. 26, 2009 entitled "Intelligent Power Control in a Wireless Network".
Office Action mailed Oct. 16, 2008 in U.S. Appl. No. 11/265,433, filed Nov. 1, 2005.

Scott Baxter, "Course 132 Technical Introduction to CDMA, IS-95 CDMA and a few details of CDMA 2000 1X", available at www.howcdmaworks.com (Feb. 2003).
Unpublished U.S. Appl. No. 12/756,041, filed Apr. 7, 2010 entitled "Mobile Station-Initiated Removal of a High-Congestion Sector from the Active Set".

* cited by examiner

ACTIVE SET MANAGEMENT BASED ON MOBILE STATION BATTERY POWER

BACKGROUND

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC), which (a) controls one or more BTSs and (b) acts as a conduit between the BTS(s) and one or more switches or gateways, such as a mobile switching center (MSC) and/or packet data serving node (PDSN), which may in turn interface with one or more signaling and/or transport networks.

As such, mobile stations can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

OVERVIEW

In Code Division Multiple Access (CDMA) systems, such as those compliant with IS-2000, a mobile station can communicate on a given carrier frequency with a number of "active" sectors concurrently, which collectively make up the mobile station's "active set." To create its active set, a mobile station typically scans for available pilot signals and populates the active set with sectors having a pilot signal above a threshold level. Under IS-2000, a mobile station continually scans the pilot signals from its active sectors as well as from other sectors, as the signal strength in each sector may vary as the mobile station moves about within the wireless communication system, or as other factors cause radio frequency (RF) conditions to change. The mobile station then reports the received signal strengths to the serving base station, which in turn directs the mobile station to update its active set in accordance with the reported strengths and one or more threshold conditions.

During a call, a mobile station operating under IS-2000 receives a signal from all of its active sectors, and selects the best signal on a frame-by-frame basis. As a result, the number of active sectors may affect the amount of power consumed during a call. Furthermore, the more sectors in the active set, the longer the mobile station may spend a scanning for the pilot signals from the active set. And when the mobile station spends more time scanning for the pilot signals, a mobile station may also use more battery power. Accordingly, among other benefits, exemplary methods and systems may help a mobile station more efficiently use its battery power by dynamically adjusting active-set parameters in effort to reduce the number of active sectors. For instance, in exemplary embodiments, the mobile adjust the maximum number of active sectors based upon the battery-power level of the mobile station and/or active-set parameters affecting whether or not a given sector is included in the active set (e.g., parameters affecting whether a given sector is added to and/or dropped from the active set).

In one aspect, an exemplary method involves: (a) a mobile station determining a battery-power level of the mobile station; (b) the mobile station using the determined battery-power level as a basis for setting at least one active-set parameter affecting the number of active sectors in an active set of the mobile station; and (c) the mobile station maintaining the active set according to the at least one active-set parameter.

In an exemplary embodiment, setting the at least one active-set parameter may involve setting a maximum number of active sectors that the mobile station can include in the active set of the mobile station. For example, if the determined battery-power level is above a first threshold, then the mobile station may set the maximum number of active sectors to an initial maximum number, and if the determined battery-power level is below the first threshold, then the mobile station may set the maximum number of active sectors to a first reduced number that is less than the initial maximum number. Using the determined battery-power level as a basis for setting the maximum number of active sectors may further involve, if the determined battery-power level is below a second threshold, then setting the maximum number of active sectors to a second reduced number, wherein the second threshold corresponds to a lower battery-power level than the first threshold, and wherein the second reduced number is less than the first reduced number.

In another exemplary embodiment, setting the at least one active-set parameter may involve setting at least one active-set parameter affecting whether or not a given sector is included in the active set. For example, the mobile station may use the determined battery-power level as a basis for (i) setting at least one active-set parameter such that it is less likely that a given sector will be added to the active set and/or (ii) setting at least one active-set parameter such that it is more likely that a given sector will be dropped from the active set. Such active-set parameters may include: (a) a threshold pilot strength for addition to the active set (T_ADD), (b) a threshold difference in signal strength from an active set pilot (T_COMP), (c) a threshold pilot strength for removal from the active set (T_DROP), and/or (d) a time for which an active set pilot falls below T_DROP to justify removal from the active set (T_TDROP).

Furthermore, an exemplary method may be conditioned upon the signal strengths of the active sectors. For example, an exemplary method may further involve the mobile station determining an average signal strength for one or more of the active sectors in the active set of the mobile station and conditioning performance of the method upon the average signal strength being greater than a threshold average signal strength. As another example, a mobile station may determine signal strength for one or more active sectors in the active set of the mobile station and condition performance of the method upon at least a minimum number of the active sectors having a signal strength that is greater than a threshold signal strength.

In another aspect, an exemplary method may involve: (a) a mobile station making a determination that a battery-power level for the mobile station is below a first threshold level; (b)

responsive to the determination that the battery-power level is below the first threshold level, the mobile station reducing a maximum-active-sector parameter from an initial value to a first reduced value, wherein the value of the maximum-active-sector parameter indicates a maximum number of active sectors that the mobile can include in the active set of the mobile station; and (c) the mobile station maintaining its active set according to the first reduced value of the maximum-active-sector parameter. The exemplary method may further involve the mobile station making a determination that the battery-power level for the mobile station has further fallen and is below a second threshold level and responsive to the determination that the battery-power level is below the second threshold level, the mobile station reducing the maximum-active-sector parameter to a second reduced value.

In an exemplary embodiment wherein the first threshold level is ten percent of a fully-charged battery-power level and the second threshold level is five percent of the fully-charged battery-power level. Further, in this exemplary embodiment, the initial value of the maximum-active-sector parameter may be six, the first reduced value of the maximum-active-sector parameter may be four, and the second reduced value of the maximum-active-sector parameter may be three.

And in another aspect, an exemplary method may involve: (a) a mobile station making a determination that a battery-power level for the mobile station is below a first threshold level; (b) responsive to the determination that the battery-power level is below the first threshold level, the mobile station adjusting at least one active-set parameter affecting whether or not a given sector is included in the active set in effort to reduce the number of active sectors in the active set; and (c) the mobile station maintaining its active set according to the at least one adjusted active-set parameter.

In yet another aspect, an exemplary system may include: (i) a tangible computer-readable medium; and (ii) program instructions stored in the tangible computer-readable medium and executable by at least one processor to: (a) determine a battery-power level of the mobile station; (b) use the determined battery-power level as a basis to set a maximum number of active sectors that the mobile station can include in the mobile station's active set; and (c) maintain the mobile station's active set according to the maximum number of active sectors.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Figure 1:
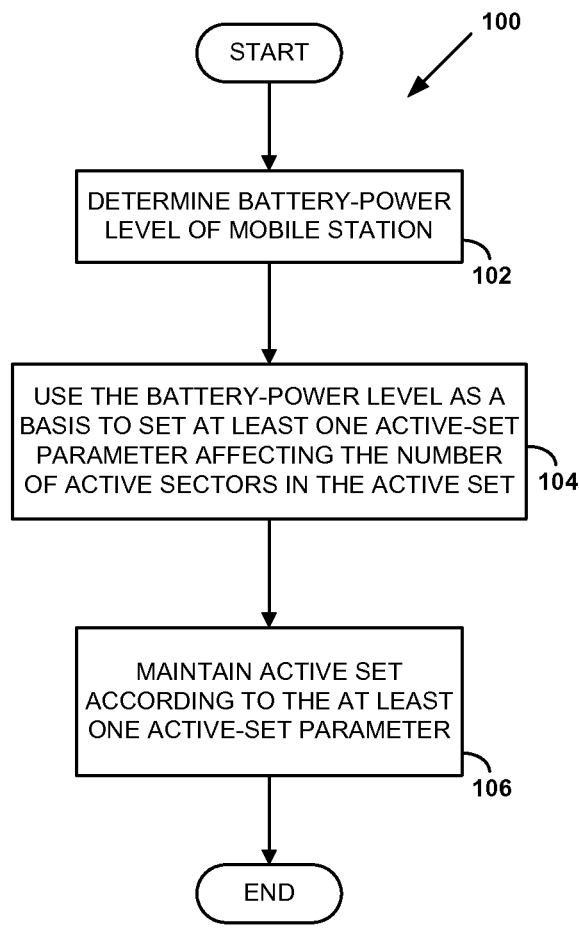
FIG. 1 is a flow chart illustrating a method, according to an exemplary embodiment.

FIG. 1 is a flow chart illustrating a method 100, according to an exemplary embodiment. The method 100 involves a mobile station determining its battery-power level, as shown by block 102. The mobile station then uses the determined battery-power level of the mobile station as a basis to set at least one active-set parameter affecting the number of active sectors in its active set, as shown in block 104. The mobile station then maintains its active set according to the new setting of the at least one active-set parameter, as shown by block 106.

Mobile stations commonly monitor or check their battery level in order to, for example, display a visual indicator of the battery-power level. As such, mobile-station processes for determining battery-power level are well known in the art, and not discussed in detail herein. Generally, a mobile station may use any technique, now known or later developed, to determine its battery-power level, without departing from the scope of the invention.

A number of different active-set parameters may affect the number of active sectors in its active set, and may therefore be adjusted according to the exemplary method. According to exemplary embodiments, a mobile station may dynamically adjust the maximum number of sectors allowed in its active set. Since the amount of power required to scan the active set increases as the number of active sectors increases, reducing the maximum number of active sectors may help to reduce the amount of power consumed by a mobile station during the process of scanning its active set. As such, an exemplary method may involve a mobile station reducing its maximum number of active sectors as the mobile station's battery power decreases. For example, one or more battery-power thresholds may be defined which indicate when the mobile station should reduce the maximum number of active sectors. The mobile station's battery power may then be compared to these thresholds so that the maximum number of active sectors may be adjusted accordingly.

As additional examples of active-set parameters that may be adjusted, the mobile station may set one or more active-set parameters affecting whether or not a given sector is included in the active set. More specifically, certain threshold signal strengths may be defined to indicate, for example, whether to add or drop a sector from the active set. Accordingly, an exemplary method may additionally or alternatively involve a mobile station adjusting such add/drop thresholds so as to increase the signal strength required for addition to the active set (making it less likely that a sector will be added to the active set) and/or increase the signal strength at which a given sector is dropped from the active set (making it less likely that an active sector will remain in the active set). The effect of doing so may be a reduced number of active sectors, thus conserving battery life when the mobile station's battery is low.

Figure 2:
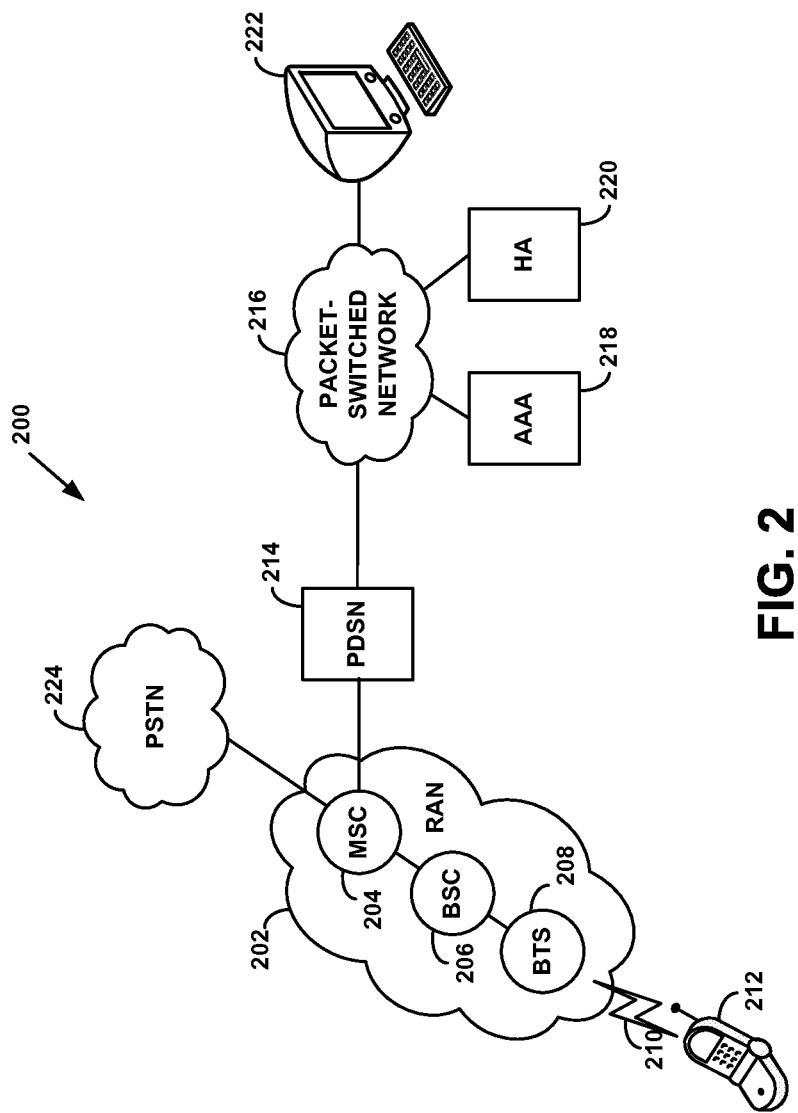
FIG. 2 is a simplified block diagram of a wireless communication system in which an exemplary embodiment may be implemented.

FIG. 2 is a simplified block diagram of a wireless communication system 200 in which an exemplary embodiment may be implemented. In such a wireless communication system, a wireless carrier typically operates a radio access network (RAN) 202, which is controlled by a switching entity such as a mobile switching center (MSC) 204. The MSC generally includes or connects with one or more base station controllers (BSCs) 206, which in turn connect with one or more base transceiver stations (BTSs) 208. Each BTS 208 conventionally includes a cell tower with one or more antennas that communicate with mobile stations, such as mobile station 212, via an air interface 210.

Communications between the RAN 202 and mobile station 212 may occur in accordance with any air interface protocol now known or later developed. Examples of such protocols include Code Division Multiple Access (CDMA) (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, and infrared. Other protocols may also be employed.

With the illustrated configuration, RAN 202 may provide service in an area that is divided geographically into a number of cells, each defined by a radio frequency (RF) radiation pattern from a BTS 208. Furthermore, each cell may be subdivided into a number of sectors. For simplicity, references to a "sector" herein should be understood to include sectors, cells, and possibly other types of coverage areas as well. In general, air interface communications in each sector (or other such coverage area) of a cellular wireless communication system can be encoded or carried in a manner that distinguishes the communications in that sector from communications in adjacent sectors. For example, in a CDMA system operating under the IS-2000 standard, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

Further, air interface communications between mobile station 212 and BTS 208 may be classified as forward link communications, which are those passing from BTS 208 to the mobile station 212, and reverse link communications, which are those passing from mobile station 212 to BTS 208. In an IS-2000 system, both the forward link and reverse link communications in a given wireless service sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

As shown, BSC 206 may function to control one or more BTSs, such as BTS 208, and to provide those one or more BTSs with connections to switches, such as MSC 204 or packet-data serving node (PDSN) 214, for instance. PDSN 214 in turn provides connectivity with a packet-switched network 216, such as the Internet and/or a wireless carrier's private core packet-network. Sitting as nodes on network 216 are, by way of example, an authentication, authorization, and accounting (AAA) server 218, a mobile-IP home agent (HA) 220, and a remote computer 222. After acquiring an air traffic channel over its air interface, a mobile station (e.g., mobile station 212) may send a request to PDSN 216 for a connection in the packet data network. Then, following authentication of the mobile station by AAA server 218, the mobile station may be assigned an IP address by the PDSN or by HA 220, and may thereafter engage in packet-data communications with entities such as remote computer 222.

MSC 204 may be any networking element arranged to carry out the switch functions described herein. Thus, MSC 204 may include a communication interface, a processor, and data storage comprising instructions executable by the processor to carry out those switch functions. The communication interface may include one or more wired (e.g. Ethernet) and/or wireless (e.g. WiFi or WiMax) interfaces for communicating with at least BSC 206 and a public-switched telephone network (PSTN) 224.

Note that the combination of BTS 208 and BSC 206 may be considered a "base station." However, BTS 208 or BSC 206 could, taken alone, each be considered a base station as well. Furthermore, a base station may be considered to be either or both of those devices, and perhaps make use of one or more functions provided by MSC 204, and/or other network entities.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein.

Referring now to mobile station 212, it may be any mobile device arranged to carry out the mobile-station functions described herein. As examples, mobile station 212 could take the form of or include a cell phone, a PDA, a computer, a laptop computer, a hybrid CDMA/EV-DO device, and/or a multi-mode cellular/Wi-Fi device. As such, a mobile station may include a user interface, a wireless-communication interface, a processor, and data storage comprising instructions executable by the processor for carrying out those mobile-station functions. The user interface may include buttons, a touchscreen, a microphone, and/or any other elements for receiving inputs, as well as a speaker, one or more displays, and/or any other elements for communicating outputs. Further, while the term "mobile station" is a term of art commonly used for such devices, the term "mobile station" should be understood to include non-mobile devices, such as a personal computer or any other device capable of the functionality of a mobile station described herein.

In an exemplary embodiment, mobile station 212 may be configured to maintain an "active set" of sectors (each referred to as an "active sector") for which the mobile station monitors the signal strength, and with which the mobile station is in communication during a call. For example, under IS-2000, the base station provides the mobile station the following parameters, which relate to pilot signal strength and are used by the mobile station to maintain its active set:

T_ADD: Threshold pilot strength for addition to the active set (e.g., −14 dB)

T_COMP: Threshold difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

The base station also provides the mobile station with a Neighbor List Update Message (NLUM), which identifies the "neighbor" sectors, which are not in the active set, but are identified as candidates for the active set.

The mobile station 212 then scans for all of the pilot signals from the sectors in its active set, and measures the received signal strength for each. For example, mobile station 212 may calculate $E_c/I_o$ for each sector in the active set, where $E_c$ is energy per chip and $I_o$ is the total power received. If the pilot signal strength of any neighbor sector exceeds T_ADD, the mobile station 212 adds the pilot to its "candidate" set and sends a Pilot Strength Measurement Message (PSMM) to the base station with the estimated $E_c/I_o$ for the pilot and information indicative of the identity of the sector. Further, if the pilot strength exceeds the strength of any active-sector signal by T_COMP (and possibly also depending on current capacity and other issues), then the base station may send a Handoff Direction Message (HDM) to the mobile station, listing the pilot as a new member of the active set. Upon receipt of the HDM, the mobile station 212 then adds the pilot to its active set as instructed, and the mobile station sends a Handoff Completion Message (HCM) to the base station (e.g., to BTS 108), acknowledging the instruction, and providing a list of the pilots (PN offsets) in its active set. Depending on system configuration, the mobile station may also identify pilot signals from the remaining set of sectors if they exceed the thresholds. It should be understood that each active sector in the active set is represented by its corresponding PN offset, and that references to an active sector may also be considered to refer to the PN offset of the active sector.

Similarly, if the mobile station 212 detects that the signal strength of a pilot in its active set drops below T_DROP, the mobile station starts a handoff drop timer. If T_TDROP passes, the mobile station then sends a PSMM to the base station, indicating the $E_c/I_o$ and drop timer. The base station may then respond by sending an HDM to the mobile station, without the pilot in the active set. The mobile station would then receive the HDM and responsively move the pilot to its neighbor set and send an HCM to the base station.

Under IS-2000, a mobile station 212 will continually scan its active sectors, neighbor sectors, and candidate sectors in a cyclical manner, according to a schedule under which active sectors are scanned twice as frequently of neighbor sectors, and neighbor sectors in turn are scanned twice as frequently as candidate sectors. The details of this scanning process are generally known to those skilled in the art, and thus not discussed in further detail herein. Further, when the mobile station 212 is engaged in IS-2000 communications, mobile station 212 decodes transmissions using all the PN offsets in its active set, together with the respective Walsh codes assigned for each PN-identified sector. Then, on a frame-by-frame basis, the mobile station may select a sector from its active set from which to receive forward-link traffic.

Since a mobile station receives communications on active sectors during a call, increasing the number of active sectors will generally increase the amount of power consumed during a call. Accordingly, an exemplary mobile station is configured to dynamically adjust the maximum number of active sectors that can be included in its active set. As such, the mobile station may set the maximum number of active sectors to six by default (per typical IS-2000 configurations), in which case up to six sectors may be included in the active set and scanned as active sectors. However, the mobile station may adjust the maximum number of active sectors to three, for instance, in which case up to three sectors may be included in its active set. Other adjustments to the maximum number of active sectors are also possible. Further, it should be understood that there is no requirement that a mobile station actually include the maximum number of active sectors in its active set. This maximum number should therefore be understood as a constraint on the active set, but no necessarily a requirement. As such, it is possible that, at a given point in time, less than the maximum number of sectors meet the criteria for the active set, and as a result, less than the maximum number of sectors will be included in the active set.

To implement this functionality (and other mobile-station functionality described herein), an exemplary mobile station may include a tangible computer-readable medium with program instructions stored thereon, which are executable by a processor to carry out the various functions described herein. For example, an exemplary mobile station may include program instructions that are executable to: (a) determine a battery-power level of the mobile station, (b) use the determined battery-power level as a basis to set a maximum number of active sectors that the mobile station can include in the mobile station's active set, and (c) maintain the mobile station's active set according to the maximum number of active sectors.

In practice, a mobile station may vary the maximum number of active sectors by updating a maximum-active-sector parameter, which is stored locally in memory, and which indicates the current maximum number of active sectors that are allowable in the active set. Further, in order to adjust the maximum number, the mobile station may store battery-power-to-active-sector correlation data that maps battery-power levels or ranges of battery-power levels to corresponding maximum numbers.

Figure 3:
FIG. 3 is a table illustrating a set of battery-power-to-active-sector correlation data, according to an exemplary embodiment.

FIG. 3 is a table illustrating a set of battery-power-to-active-sector correlation data 300, according to an exemplary embodiment. In FIG. 3, column 302 defines ranges of battery-power levels, and column 304 defines a maximum number of active sectors corresponding to each of the ranges. More specifically, the correlation data 300 indicates that: (a) when the battery-power level of the mobile station is greater than 10% of the fully-charged battery-power level (i.e., when the battery holds between 11% to 100% of its full charge), the mobile station should set the maximum number of active sectors to six, (b) when the battery-power level of the mobile station is between 5% and 10%, the mobile station should set the maximum number of active sectors to four, and (c) when the battery-power level of the mobile station is less than 5%, the mobile station should set the maximum number of active sectors to three. It should be understood that the battery-power-to-active-sector correlation data shown is but one example, and that in general, the ranges of battery-power levels and/or the corresponding values for the maximum-active-sector parameter may be selected as a matter of engineering design choice.

Figure 4A:
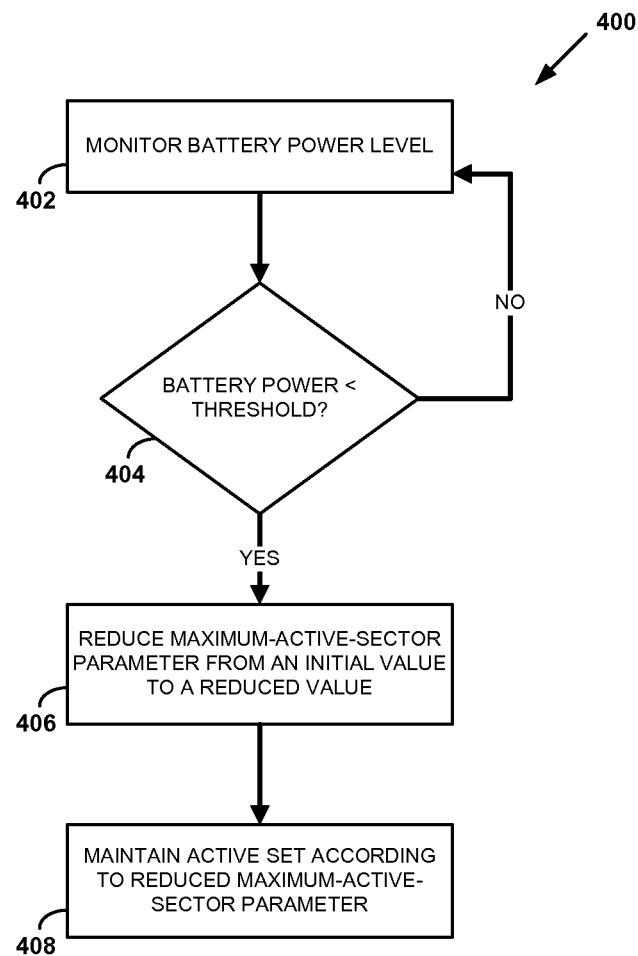
FIG. 4A is another flow chart illustrating a method, according to an exemplary embodiment.

FIG. 4A is a flow chart illustrating a method 400, according to an exemplary embodiment. As shown, method 400 involves the mobile station monitoring its battery-power level, as shown by block 402. This may be accomplished by continuous monitoring of the battery-power level, by periodically checking the battery-power level, or in simplest form, by a single check of the battery-power level. At some point, the mobile station makes a determination that its battery-power level is below a first threshold, as shown by block 404. Responsive to this determination, the mobile station reduces its locally-stored maximum-active-sector parameter from an initial maximum number to a reduced maximum number, as shown by block 406. The mobile station then maintains its active set according to the reduced maximum number (i.e., limits the number of active sectors to the reduced maximum number).

In method 400, a single threshold is defined, and as such the mobile station may dynamically switch between two values for the maximum-active-sector parameter. For instance, the mobile station may by default allow for up to six active sectors (i.e., set the maximum-active-sector parameter equal to six), and reduce the maximum number of sectors to three (i.e., set the maximum-active-sector parameter equal to three) when the mobile station detects that its battery-power level has dropped below 20% of its fully-charged level. It should be understood that in other embodiments, the threshold may differ, and further, that additional thresholds may be defined (along with corresponding values for the maximum-active-sector parameter).

In a further aspect, after reducing the maximum number of active sectors, the mobile station may continue to monitor its battery-power level, checking whether the battery-power remains below the threshold, or whether its battery has been charged such that its battery-power level is back above the threshold level. In the event that the battery is charged to above the threshold level, the mobile station may reset the maximum-active-sector parameter to its initial value. For example, continuing the previous example, if the mobile station detects that its battery has been recharged to above 20% of the fully-charged level, the mobile station may increase the maximum number of active sectors by setting the maximum-active-sector parameter equal to six (i.e., reset the maximum-active-sector parameter to its initial setting).

Figure 4B:
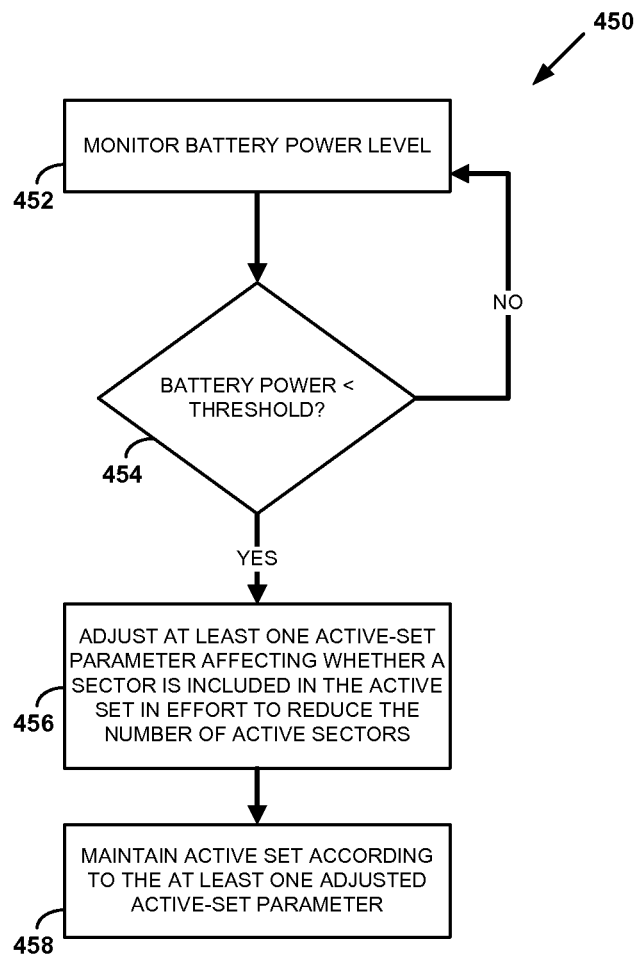
FIG. 4B is another flow chart illustrating a method, according to an exemplary embodiment.

FIG. 4B is a flow chart illustrating a method 450, according to an exemplary embodiment. As shown, method 450 involves the mobile station monitoring its battery-power level, as shown by block 452. At some point, the mobile station makes a determination that its battery-power level is below a first threshold, as shown by block 454. Responsive to this determination, the mobile station adjusts at least one active-set parameter affecting whether a sector is included in the active set, in effort to reduce the number of active sectors, as shown by block 456. The mobile station then maintains its active set according to the at least one active set parameter. As in method 400, a single threshold is defined in method 450, and as such the mobile station may dynamically switch between two values for the maximum-active-sector parameter. It should be understood that in other embodiments, the threshold may differ, and further, that additional thresholds may be defined (along with corresponding values for the maximum-active-sector parameter).

The mobile station may adjust a number of parameters affecting whether a sector is included in the active set, either alone or in combination with each other. For example, the mobile station may adjust the value of T_ADD, T_COMP, T_DROP, and/or T_TDROP. In an exemplary embodiment, the mobile may adjust one or more of these active-set parameter such that it is less likely that a given sector will be added to the active set and/or such that it is more likely that a given sector will be dropped from the active set. For example, the mobile may increase T_ADD, increase T_COMP, decrease T_DROP, and/or decrease T_TDROP. Other examples are also possible.

Figure 5A:
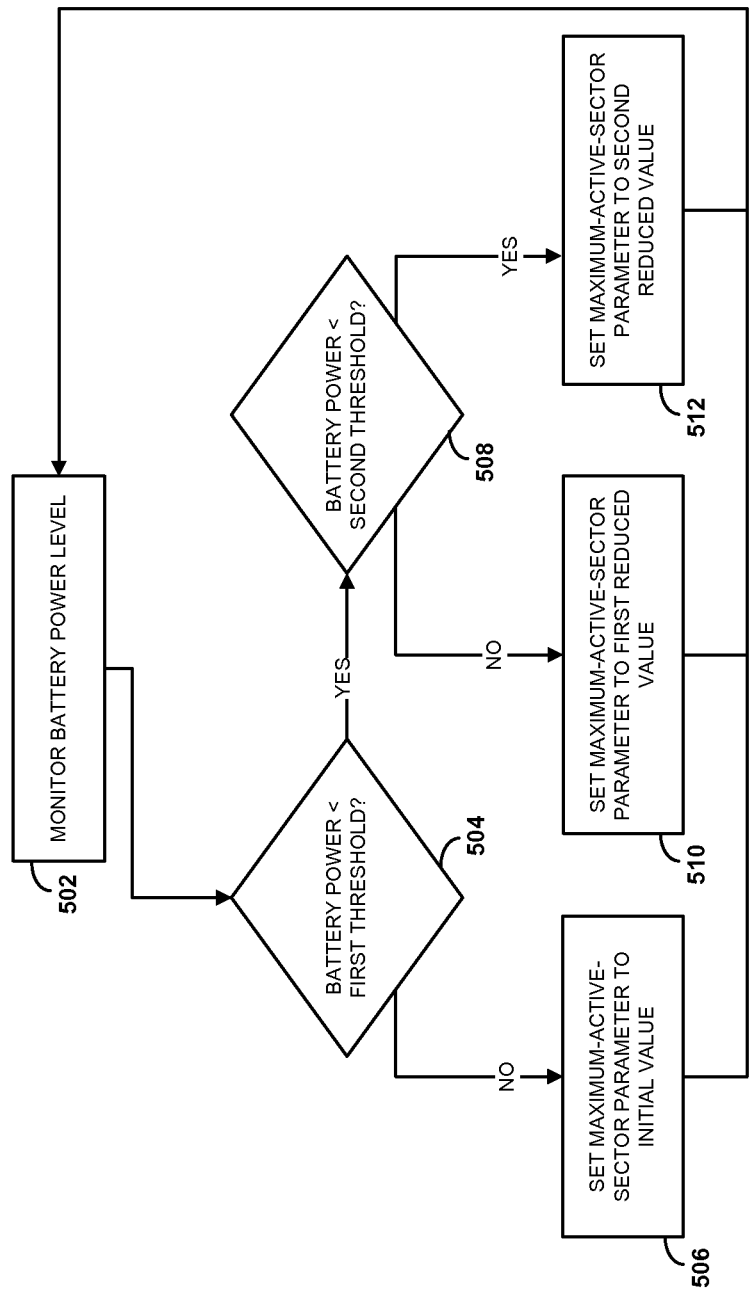
FIG. 5A is another flow chart illustrating a method, according to an exemplary embodiment.
Figure 5B:
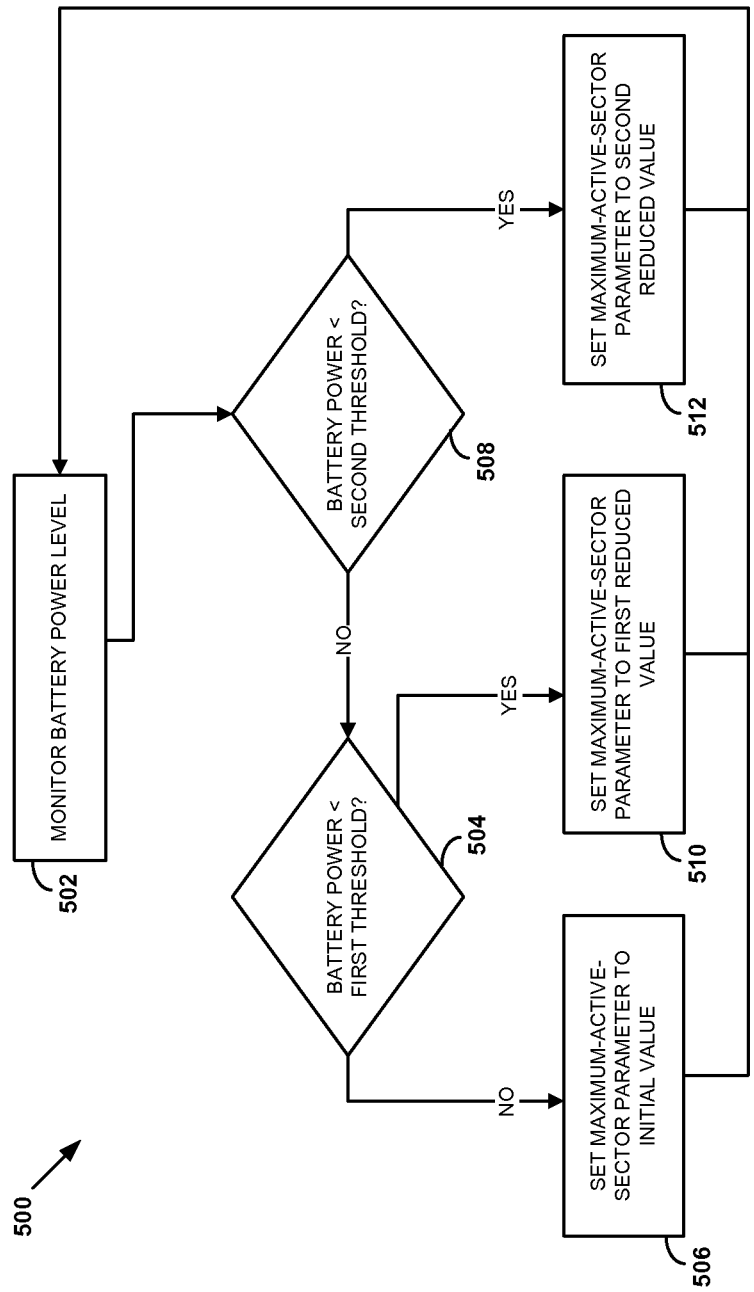
FIG. 5B is another flow chart illustrating a method, according to an exemplary embodiment.

FIGS. 5A and 5B are flow charts illustrating a method, according to an exemplary embodiment. In this method, there are two battery-power thresholds (a first threshold at a higher power level than a second threshold), and thus three possible values for the maximum-active-sector parameter. Furthermore, in an aspect that may provide for more efficient performance, the method shown in FIGS. 5A and 5B is stateful, varying depending upon the current value of the maximum-active-sector parameter. In particular, FIG. 5A illustrates an exemplary process when the mobile station is operating with the maximum-active-sector parameter set to an initial value (i.e., a value that corresponds to a battery power above both thresholds). FIG. 5B, on the other hand, illustrates an exemplary process when the mobile station the mobile station is operating with the maximum-active-sector parameter set to the first or second reduced value (i.e., when the battery power at a lower level).

Referring more specifically to FIG. 5A, the mobile station continually or periodically monitors its battery-power level, as shown by block 502. As such, the mobile station may detect when its battery-power level is below the first threshold, as shown by block 504. If the battery-power level is above the first threshold, then the mobile station sets its maximum-active-sector parameter to the initial value, as shown by block 506. This initial value is preferably the highest value of the three possible values for the maximum-active-sector parameter (as it is used when the battery-power level is above both the first and second threshold). In the case where the maximum-active-sector parameter is already set at the initial value, the setting of the maximum-active-sector parameter may be a passive function (i.e., simply leaving the parameter value unchanged).

If the mobile station detects that the battery-power level is below the first threshold, then the mobile station determines whether its battery-power level is further below the second threshold, as shown by block 508. If it is not, this means that the battery-power level is between the first and second thresholds. In this scenario, the mobile station sets its maximum-active-sector parameter equal to a first reduced value, as shown by block 510, which is preferably less than the initial value. If, however, the battery-power level is below the second threshold (and thus below the higher first threshold as well), then the mobile station sets its maximum-active-sector parameter equal to a second reduced value, as shown by block 512, which is preferably less than both the initial value and the first reduced value.

As noted, the portion of the method shown in FIG. 5A is stateful, and carried out when the maximum-active-sector parameter is set to the initial value. Since the maximum-active-sector parameter typically set to the initial value when the battery-power level is above both thresholds, it may be more efficient to first check whether the battery-power level is below the first threshold, as the first threshold is preferably set to a higher level than the second threshold. However, when the maximum-active-sector parameter is set to one of the reduced values, however, it may be more efficient to first check whether or not the battery-power level is below the second threshold, as illustrated in FIG. 5B.

Referring to FIG. 5B more specifically, when the maximum-active-sector parameter is set to the first or second reduced value, the mobile station continues to monitor its battery-power level, as shown by block 502. However, the mobile station first determines whether or not the battery-power level is below the second threshold, as shown by block 508. If the battery-power level is below the second threshold, then the mobile station sets its maximum-active-sector parameter equal to the second reduced value, as shown by block 512. If the battery-power level is above the second threshold, then the mobile station determines whether the battery-power level is still below the first threshold (i.e., in between the first and second threshold), as shown by block 504. Then, if the battery-power level is above the first threshold, the mobile station sets its maximum-active-sector parameter to the initial value, as shown by block 506. On the other hand, if the battery-power level is below the first threshold, then the mobile station sets its maximum-active-sector parameter equal to a first reduced value, as shown by block 510.

Figure 6:
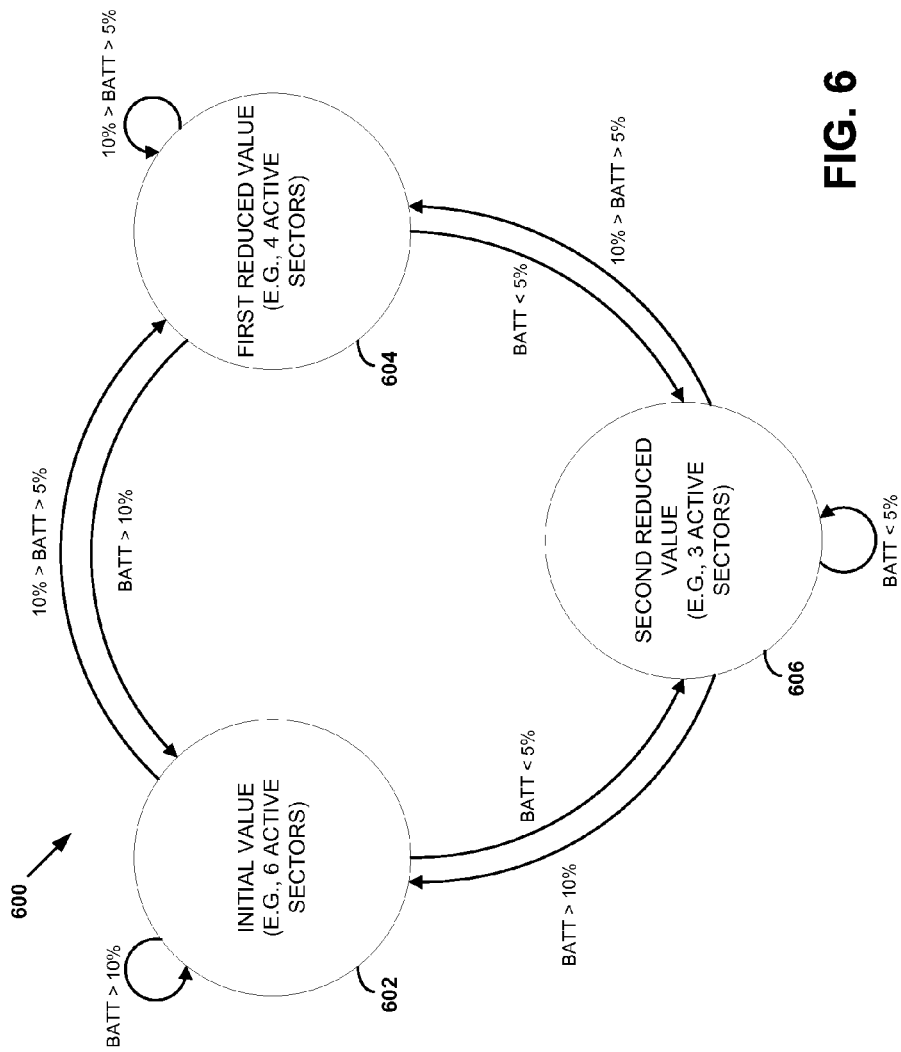
FIG. 6 is a state diagram illustrating the transitions between different states (i.e., between different values for the maximum-active-sector parameter) according to an embodiment of the method shown in FIGS. 5A and 5B.

FIG. 6 is a state diagram 600 illustrating the transitions between different states (i.e., between different values for the maximum-active-sector parameter) according to an embodiment of the method shown in FIGS. 5A and 5B. In the illustrated embodiment, the initial value for the maximum-active-sector parameter is six, the first reduced value is four, and the second reduced value is three. Further, in this embodiment, the first threshold is 10% and the second threshold is 5%. It should be understood, however, that the thresholds and corresponding values for the maximum-active-sector parameter may differ as a matter of engineering design choice.

As shown by state diagram 600, when the mobile station is operating in state 602, the mobile station maintains its active set according to the initial value for the maximum-active-sector parameter (e.g., a maximum of six active sectors). As long as the mobile station's battery power remains above 10%, the mobile station continues to include up to six active sectors in its active set. If the battery-power level drops below 10%, but remains above 5%, the mobile station transitions from state 602 to state 604, and thus sets the maximum-active-sector parameter equal to the first reduced value (e.g., a maximum of four active sectors). And if the battery-power level drops below 5%, the mobile station transitions from state 602 to state 606, and thus sets the maximum-active-sector parameter equal to the second reduced value (e.g., a maximum of three active sectors).

Once the mobile station is operating in state 604, the mobile station will remain in state 604, and thus continues to include up to four active sectors in its active set, as long as it detects that the battery-power level is between 5% and 10% of the fully-charged level. If the battery-power level drops below 5%, however, the mobile station transitions from state 604 to state 606, and thus reduces the maximum-active-sector parameter to three. On the other hand, if the mobile station detects that the battery has been charged to above 10% of the fully-charged level, the mobile station transitions from state 604 back to state 602, and thus increases the maximum-active-sector parameter to six.

When the mobile station is operating in state 606, the mobile station will remain in state 606, and thus include up to three active sectors in its active set, as long as it detects that the battery-power level remains below 5% of the fully-charged level. If the battery is charged to above 5%, but remains below 10%, then the mobile station transitions from state 606 to state 604, and thus increases the maximum-active-sector parameter to four. And if the mobile station detects that the battery has been charged to above 10%, the mobile station transitions from state 606 to state 602, and thus increases the maximum-active-sector parameter to six.

It should be understood that the mobile station preferably checks its battery power frequently enough that it will usually detect that the battery-power level has fallen to between 5% and 10%, before detecting the battery-power level has fallen below 5%. As such, a mobile station will typically first transition from state 602 to state 604, and then transition from state 604 to state 602. However, it is within the scope of the invention that a mobile station may transition between states 602, 604 and 606 in any order, depending on the battery-power level and current value of the maximum-active-sector parameter, as shown in FIG. 6.

In a further aspect, an exemplary method may be carried out in response to determination that the signals from the active sectors are adequate, such that reducing the size of the active set is feasible. For example, the mobile station may require that the signal strength (e.g., $E_c/I_o$) for a certain number of active sectors be above a predetermined threshold signal strength, and only carry out an exemplary method if this condition is met. As another example, a mobile station may determine the average signal strength in its active set (e.g., the average $E_c/I_o$ of the active sectors), and condition performance of an exemplary method upon the average signal strength being above a predetermined threshold average. Other examples are also possible. In any such scenario, when the condition is not met, the mobile station may continue to operate with a initial maximum number of active sectors (e.g., which may be a standard setting under IS-2000, such as three or six for instance), regardless of its battery-power level.

Furthermore, while an exemplary method may provide greater power savings during an active call (as the number of sectors with which the mobile station is concurrently in communication with may be reduced), it should be understood that an exemplary method may be implemented while a mobile station is actively engaged in a call, or while the mobile station is idle.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
   (a) a mobile station determining a battery-power level of the mobile station;
   (b) the mobile station using the determined battery-power level as a basis for setting at least one active-set parameter affecting the number of active sectors in an active set of the mobile station, wherein each active sector is a sector where service is provided by a radio access network; and
   (c) the mobile station maintaining the active set according to the at least one active-set parameter.

2. The method of claim 1, wherein setting the at least one active-set parameter comprises setting a maximum number of active sectors that the mobile station can include in the active set of the mobile station.

3. The method of claim 2, wherein setting the maximum number of active sectors comprises setting a value of a maximum-active-sector parameter that is stored at the mobile station.

4. The method of claim 2, wherein using the determined battery-power level as a basis for setting the maximum number of active sectors comprises:

if the determined battery-power level is above a first threshold, then setting the maximum number of active sectors to an initial maximum number; and if the determined battery-power level is below the first threshold, then setting the maximum number of active sectors to a first reduced number that is less than the initial maximum number.

5. The method of claim 4, wherein using the determined battery-power level as a basis for setting the maximum number of active sectors further comprises:

if the determined battery-power level is below a second threshold, then setting the maximum number of active sectors to a second reduced number, wherein the second threshold corresponds to a lower battery-power level than the first threshold, and wherein the second reduced number is less than the first reduced number.

6. The method of claim 2, wherein using the determined battery-power level as a basis for setting the maximum number of active sectors comprises reducing the maximum number of active sectors in response to a determination that the battery-power level is below a threshold level, the method further comprising:

making a subsequent determination that the battery-power level for the mobile station has increased to above the threshold level; and responsive to the subsequent determination that the battery-power level is above the threshold level, increasing the maximum number of active sectors.

7. The method of claim 1, further comprising:

determining an average signal strength for one or more of the active sectors in the active set of the mobile station; and conditioning performance of the method upon the average signal strength being greater than a threshold average signal strength.

8. The method of claim 1, further comprising:

determining signal strength for one or more active sectors in the active set of the mobile station; and conditioning performance of the method upon at least a minimum number of the active sectors having a signal strength that is greater than a threshold signal strength.

9. The method of claim 1, wherein setting the at least one active-set parameter comprises setting at least one active-set parameter affecting whether or not a given sector is included in the active set.

10. The method of claim 9, wherein setting the at least one active-set parameter affecting whether or not a given sector is included in the active set comprises setting at least one of (a) a threshold pilot strength for addition to the active set (T_ADD), (b) a threshold difference in signal strength from an active set pilot (T_COMP), (c) a threshold pilot strength for removal from the active set (T_DROP), and (d) a time for which an active set pilot falls below T_DROP to justify removal from the active set (T_TDROP).

11. The method of claim 9, wherein using the determined battery-power level as a basis for setting at least one active-set parameter affecting whether or not a given sector is included in the active set comprises at least one of (a) setting at least one active-set parameter such that it is less likely that a given sector will be added to the active set and (b) setting at least one active-set parameter such that it is more likely that a given sector will be dropped from the active set.

12. A method comprising:

(a) a mobile station making a determination that a battery-power level for the mobile station is below a first threshold level;

(b) responsive to the determination that the battery-power level is below the first threshold level, the mobile station reducing a maximum-active-sector parameter from an initial value to a first reduced value, wherein the value of the maximum-active-sector parameter indicates a maximum number of active sectors that the mobile can include in the active set of the mobile station, and wherein each active sector is a sector where service is provided by a radio access network; and (c) the mobile station maintaining its active set according to the first reduced value of the maximum-active-sector parameter.

13. The method of claim 12, wherein making the determination that the battery-power level for the mobile station is below the first threshold level comprises determining that the battery-power level for the mobile station is below 10% of a full battery-power level.

14. The method of claim 12, further comprising:

the mobile station making a determination that the battery-power level for the mobile station has further fallen and is below a second threshold level; and responsive to the determination that the battery-power level is below the second threshold level, the mobile station reducing the maximum-active-sector parameter to a second reduced value.

15. The method of claim 14, wherein the first threshold level is ten percent of a fully-charged battery-power level and the second threshold level is five percent of the fully-charged battery-power level, and wherein the initial value of the maximum-active-sector parameter is six, the first reduced value of the maximum-active-sector parameter is four, and the second reduced value of the maximum-active-sector parameter is three.

16. A method comprising:

(a) a mobile station making a determination that a battery-power level for the mobile station is below a first threshold level;

(b) responsive to the determination that the battery-power level is below the first threshold level, the mobile station adjusting at least one active-set parameter affecting whether or not a given sector of a radio access network is included in the active set in effort to reduce the number of active sectors in the active set; and (c) the mobile station maintaining its active set according to the at least one adjusted active-set parameter.

17. The method of claim 16, wherein adjusting the at least one active-set parameter affecting whether or not a given sector is included in the active set comprises at least one of (a) increasing a threshold pilot strength for addition to the active set (T_ADD), (b) increasing a threshold difference in signal strength from an active set pilot (T_COMP), (c) decreasing a threshold pilot strength for removal from the active set (T_DROP), and (d) decreasing a time for which an active set pilot falls below T_DROP to justify removal from the active set (T_TDROP).

18. The method of claim 16, further comprising:

the mobile station making a determination that the battery-power level for the mobile station has further fallen and is below a second threshold level; and responsive to the determination that the battery-power level is below the second threshold level, the mobile station further adjusting the at least one active-set parameter affecting whether or not a given sector is included in the active set in effort to further reduce the number of active sectors in the active set.

19. A system comprising:
a tangible non-transitory computer-readable medium; and
program instructions stored in the tangible non-transitory computer-readable medium and executable by at least one processor to:
(a) determine a battery-power level of the mobile station;
(b) use the determined battery-power level as a basis to set at least one active-set parameter affecting the number of active sectors in an active set of the mobile station, wherein each active sector is a sector where service is provided by a radio access network; and
(c) maintain the mobile station's active set according to the at least one active-set parameter.

20. The system of claim 19, wherein the at least one active-set parameter comprises a maximum number of active sectors that the mobile station can include in the active set of the mobile station.

21. The system of claim 20, wherein the program instructions stored in the tangible non-transitory computer-readable medium and executable by at least one processor to set the maximum number of active sectors comprise program instructions stored in the tangible non-transitory computer-readable medium and executable by at least one processor to set a maximum-active-sector parameter that is stored at the mobile station.

22. The system of claim 21, further comprising battery-power-to-active-sector correlation data stored in the tangible non-transitory computer-readable medium, wherein the battery-power-to-active-sector correlation data indicates one or more value for the maximum-active-sector parameter, each value corresponding to threshold battery-power level or range of battery-power levels.

23. The system of claim 20, wherein the program instructions stored in the tangible non-transitory computer-readable medium and executable by at least one processor to use the determined battery-power level as a basis to set a maximum number of active sectors comprise program instructions stored in the tangible non-transitory computer-readable medium and executable by at least one processor to:
if the determined battery-power level is above a first threshold, then set the maximum number of active sectors to a initial maximum number; and
if the determined battery-power level is below the first threshold, then set the maximum number of active sectors to a first reduced maximum number that is less than the initial maximum number.

24. The system of claim 23, wherein the program instructions stored in the tangible non-transitory computer-readable medium and executable by at least one processor to use the determined battery-power level as a basis to set a maximum number of active sectors further comprise program instructions stored in the tangible non-transitory computer-readable medium and executable by at least one processor to:
if the determined battery-power level is below a second threshold, then set the maximum number of active sectors to a second reduced maximum number, wherein the second threshold corresponds to a lower battery-power level than the first threshold, and wherein the second reduced maximum number is less than the first reduced maximum number.

25. The system of claim 20, wherein the maximum number of active sectors has been reduced in response to a determination that the battery-power level is below a threshold level, the system further comprising program instructions stored in the tangible non-transitory computer-readable medium and executable by at least one processor to:
make a subsequent determination that the battery-power level for the mobile station has increased to above the threshold level; and
responsive to the determination that the battery-power level is above the first threshold level, increase the maximum number of active sectors.

26. The system of claim 19, further comprising program instructions stored in the tangible non-transitory computer-readable medium and executable by at least one processor to:
receive an indication of signal strengths for the active sectors in the active set;
determine an average signal strength of the active sectors; and
condition performance of the method upon the average signal strength being greater than a threshold average signal strength.

27. The system of claim 19, further comprising program instructions stored in the tangible non-transitory computer-readable medium and executable by at least one processor to:
receive an indication of one or more signal strengths for one or more active sectors in the active set; and
condition (a)-(c) upon at least a minimum number of the active sectors having a signal strength that is greater than a threshold signal strength.

28. The system of claim 19, wherein the at least one active-set parameter comprises at least one active-set parameter affecting whether or not a given sector is included in the active set.

29. The system of claim 28, wherein the program instructions stored in the tangible non-transitory computer-readable medium and executable by at least one processor to set the at least one active-set parameter affecting whether or not a given sector is included in the active set comprise program instructions stored in the tangible non-transitory computer-readable medium and executable by at least one processor to set at least one of (a) a threshold pilot strength for addition to the active set (T_ADD), (b) a threshold difference in signal strength from an active set pilot (T_COMP), (c) a threshold pilot strength for removal from the active set (T_DROP), and (d) a time for which an active set pilot falls below T_DROP to justify removal from the active set (T_TDROP).

30. The system of claim 28, wherein the program instructions stored in the tangible non-transitory computer-readable medium and executable by at least one processor to use the determined battery-power level as a basis for setting at least one active-set parameter affecting whether or not a given sector is included in the active set comprise program instructions stored in the tangible non-transitory computer-readable medium and executable by at least one processor to (a) set at least one active-set parameter such that it is less likely that a given sector will be added to the active set and/or (b) set at least one active-set parameter such that it is more likely that a given sector will be dropped from the active set.

\* \* \* \* \*